(12) United States Patent
Bender et al.

(10) Patent No.: US 6,851,372 B2
(45) Date of Patent: Feb. 8, 2005

(54) PYROTECHNICAL ACTUATOR

(75) Inventors: Rolf Bender, Siegen-Eiserfeld (DE); Markus Ermert, Burbach (DE)

(73) Assignee: Thomas Magnete GmbH, Herdorf (DE)

( * ) Notice: Subject to any disclaimer, the term of this patent is extended or adjusted under 35 U.S.C. 154(b) by 0 days.

(21) Appl. No.: 10/353,821

(22) Filed: Jan. 29, 2003

(65) Prior Publication Data

US 2003/0167959 A1 Sep. 11, 2003

(30) Foreign Application Priority Data

Jan. 31, 2002 (DE) .......................................... 102 03 710

(51) Int. Cl.$^7$ ................................................. C06D 5/00
(52) U.S. Cl. .................... 102/530; 102/202.14; 89/1.14
(58) Field of Search ........................... 102/530, 202.14; 280/741; 89/1.14

(56) References Cited

U.S. PATENT DOCUMENTS

| | | | | |
|---|---|---|---|---|
| 3,861,880 A | * | 1/1975 | Thompson | ................... 422/122 |
| 5,596,163 A | * | 1/1997 | Caflisch et al. | .......... 102/202.2 |
| 5,601,310 A | * | 2/1997 | Di Giacomo et al. | ........ 280/741 |
| 5,669,631 A | * | 9/1997 | Johnson et al. | .............. 280/741 |
| 5,719,351 A | * | 2/1998 | Johnson et al. | .............. 102/440 |
| 5,746,445 A | * | 5/1998 | Johnson et al. | .............. 280/741 |
| 5,806,884 A | * | 9/1998 | Johnson et al. | .............. 280/736 |
| 5,955,699 A | * | 9/1999 | Perotto et al. | ............... 102/530 |
| 6,516,726 B2 | * | 2/2003 | Specht | ....................... 102/530 |
| 6,615,735 B2 | * | 9/2003 | Enzmann et al. | ............ 102/288 |

FOREIGN PATENT DOCUMENTS

DE 199 22 674 A1 11/2000

* cited by examiner

*Primary Examiner*—Charles T. Jordan
*Assistant Examiner*—T. Nguyen
(74) *Attorney, Agent, or Firm*—Friedrich Kueffner

(57) ABSTRACT

A pyrotechnical actuator has a cylindrical housing surrounding a hollow chamber and a piston movably supported in the cylindrical housing. A piston rod is connected to the piston. A detonator is arranged within the hollow chamber and configured to produce a quantity of gas for moving the piston from an initial position in the cylindrical housing into an end position. The piston rod triggers an action when the piston moves into the end position or is positioned in the end position. The cylindrical housing is divided in a longitudinal direction of the cylindrical housing into housing parts. At least one holding element secures the housing parts relative to one another.

15 Claims, 7 Drawing Sheets

PYROTECHNICAL ACTUATOR

BACKGROUND OF THE INVENTION

1. Field of the Invention

The invention relates to a pyrotechnical actuator comprising a cylindrical housing which encloses a hollow chamber in which a piston is movably supported. The piston can be moved from an initial position, the rest position, into an end position by a gas quantity released by igniting a detonator arranged in the hollow chamber. The piston rod initiates an action when its piston travels to its end position or when positioned in the end position.

2. Description of the Related Art

Pyrotechnical actuators serve for triggering airbags, seat belt tightening devices, rollbars and the like. A pyrotechnical actuator of the aforementioned kind is disclosed in the German patent application 199 22 674 A1. The actuator in this prior art device is comprised of a complex rotary part into which the retainer, the detonator, as well as the piston must be introduced in a complex assembling process.

SUMMARY OF THE INVENTION

It is an object of the present invention to configure a pyrotechnical actuator such that it is comprised of simple and inexpensively producible parts and can be assembled simply and inexpensively.

In accordance with the present invention, this is achieved in that the housing is divided in the longitudinal direction and is held together by at least one holding element.

Accordingly, the housing parts (there can be two or more than two) can be manufactured in a simple way, for example, by diecasting or injection molding, wherein advantageously very complex inner contours can be produced which is not possible in the case of rotary parts. The holding element serves for connecting the housing parts so tightly with one another that the housing is held together when the detonator is ignited.

It was found to be expedient to divide the housing into two parts and to provide as a holding element a sleeve which is formed preferably as a deep-drawn part and surrounds the housing at least over portions thereof. Preferably, the sleeve is press fit onto the housing. Into one of the two parts of the housing, the retainer, the detonator, and the piston can be inserted in a simple way, for example, by hand. After these elements have been introduced, the second housing part can be placed on the first part and the sleeve can be slipped onto the housing parts. The sleeve should surround at least that portion of the housing in which a very high pressure results upon ignition of the detonator. The part which receives the retainer with its outwardly projecting connectors must not mandatorily be surrounded by the sleeve.

It was found to be expedient to provide the housing on its outer periphery with longitudinal ribs so that pushing the sleeve onto the housing and generating the press fit connection can be realized more easily.

When the housing parts have tongue and groove connections at their common joint surfaces, the housing parts can be matched more easily when assembled. The tongue and groove connections can also receive a part of the high pressure which is generated in the housing.

It is advantageous when at least the piston, preferably the piston and the piston rod, are hollow (opened by boring). This reduces the mass of the piston so that greater acceleration forces of the piston can be realized which then ensure a shorter release response time. Moreover, the braking force for negative accelerations is reduced which has a beneficial effect on the materials and also advantageously on the noise development.

When the piston rod is provided with cutting grooves, the cutting grooves can cut into the housing, for example, in the end position of the piston so that an accidental return movement of the piston or of the piston rod into the initial position is not possible.

In order to retain the piston in its initial position, it is proposed to provide the housing with an annular groove for receiving an O-ring such that the piston in the initial position rests against the O-ring. For moving the piston, the O-ring must be moved against a resistance out of the annular groove; an accidental movement of the piston is thus prevented. When the detonator is ignited, the piston lifts the O-ring out of the annular groove. In this connection, the O-ring, on the one hand, contacts the housing within the peripheral surface; on the other hand, the O-ring is compressed such that it rests against the piston rod. In this way, it is prevented that flames that pass the piston can escape from the actuator. Moreover, the O-ring has a damping effect in the end position which also provides for a gentle treatment of the material and reduces the noise level.

There is also the possibility of compressing the O-ring in the housing in a rest position, without a groove being present, such that the piston cannot be moved easily and the O-ring rests tightly against the piston rod. Only when the detonator is ignited and the gas charge released, the piston can be moved together with the O-ring into the end position. With this configuration, it is also prevented that flames can pass the piston and escape from the actuator.

As an alternative to the O-ring damping action, the piston and/or the housing can have noses which are arranged in the area of the end position and serve for damping the piston movement. The noses are compressed by the piston arriving at great speed so that the kinetic energy is transformed into deformation energy. Each nose can have a recess correlated therewith into which the deformed parts of the nose can be pressed.

As an alternative, a Teflon® ring also serving for damping can be provided between the piston and the housing in the area of the end position of the piston.

In order to ensure that flames which possibly pass the piston cannot escape from the actuator, it is proposed to provide in the housing and/or in the area of the piston rod a labyrinth-type recess. In order to ensure safe movement and quick response of the piston, it is guided with relatively great play in the housing. The flames which pass the piston swirl in the labyrinth-type recesses. This produces a greater travel distance for the flames so that they fizzle out and no longer escape from the actuator. The same holds true for the sound so that the labyrinth-type recesses also serve for sound damping or muffling.

DESCRIPTION OF THE PREFERRED EMBODIMENTS

Figure 1:
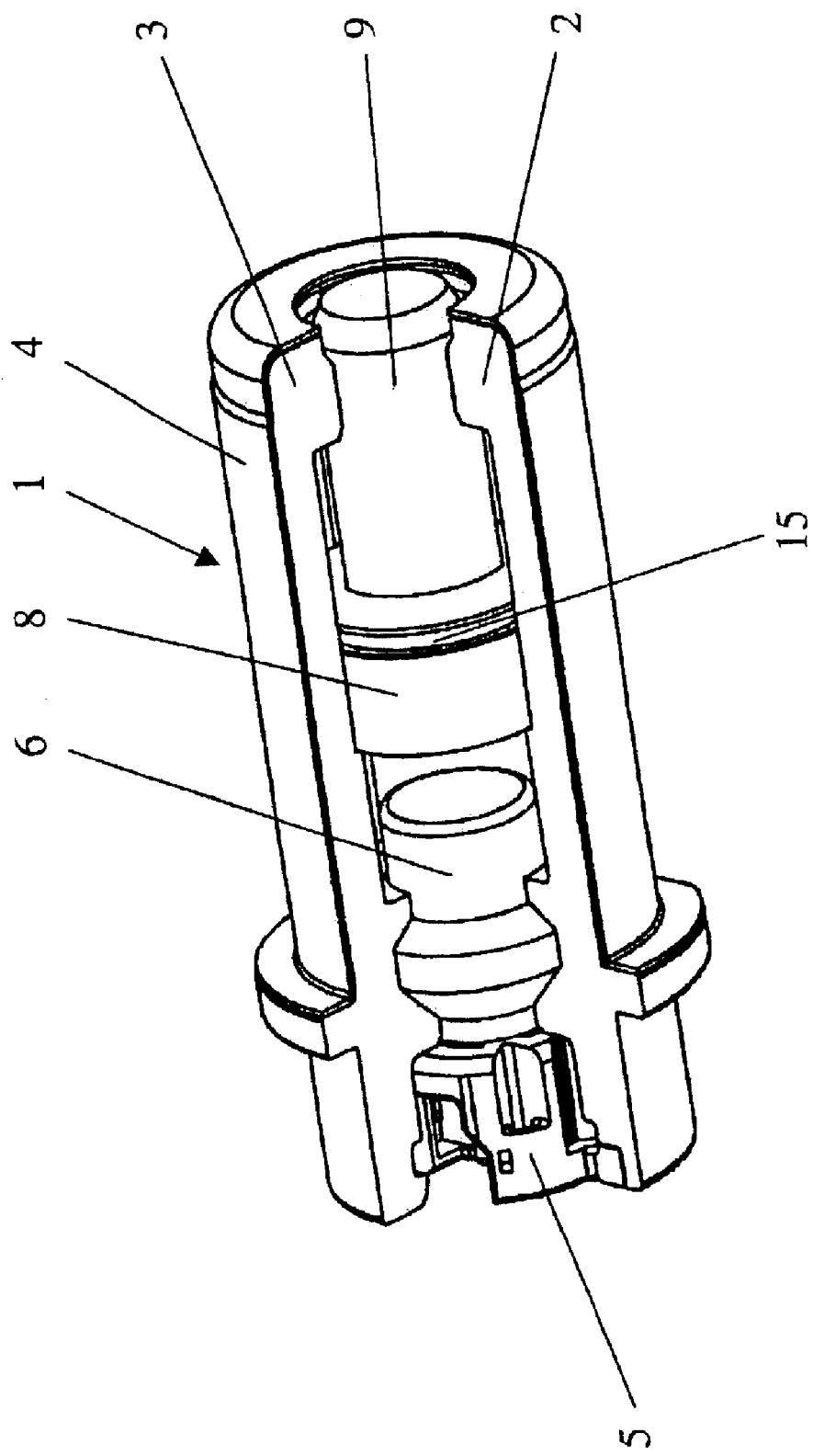
FIG. 1 shows the actuator according to the invention in a section view.
Figure 2:
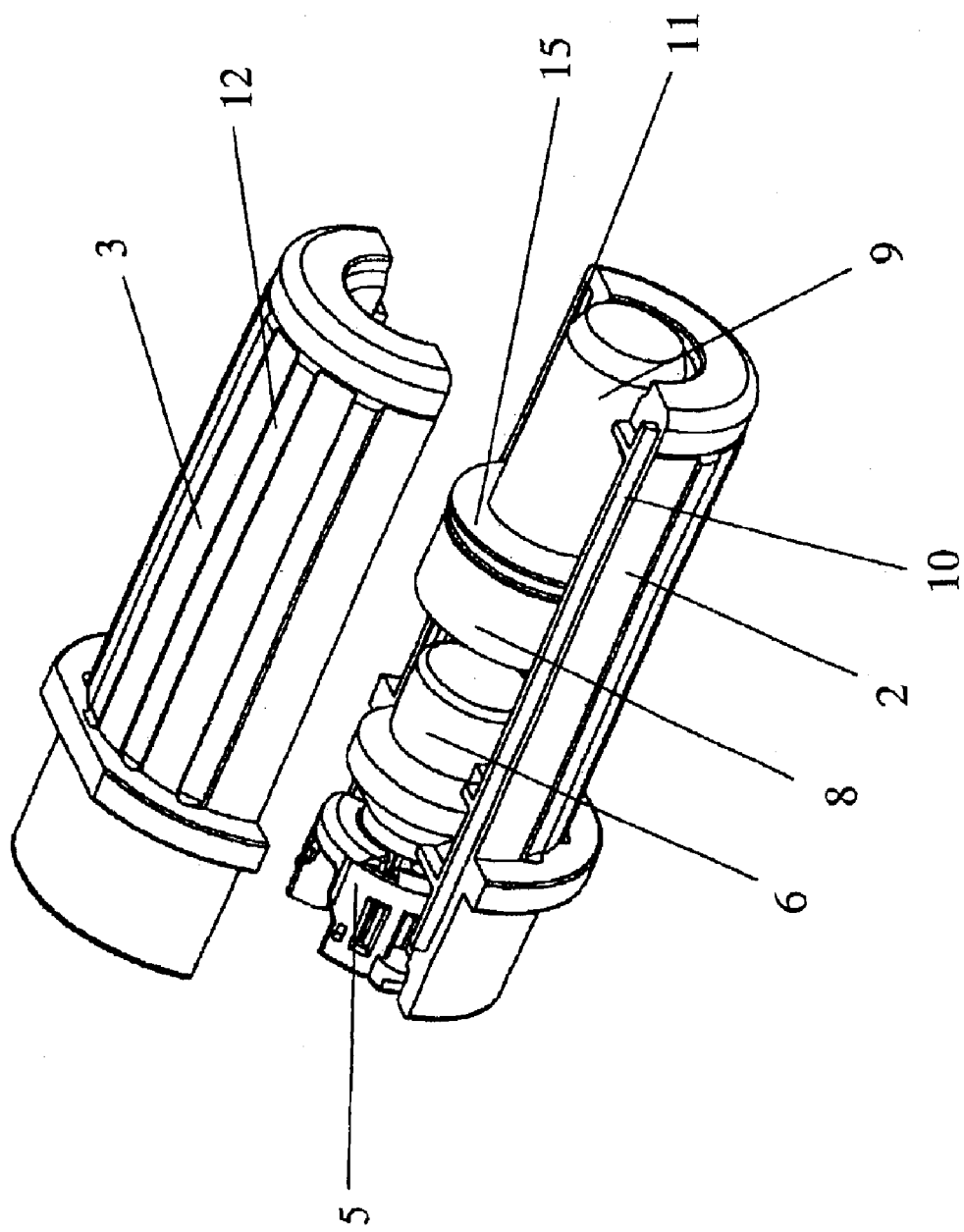
FIG. 2 shows an actuator with disassembled housing parts.
Figure 3:
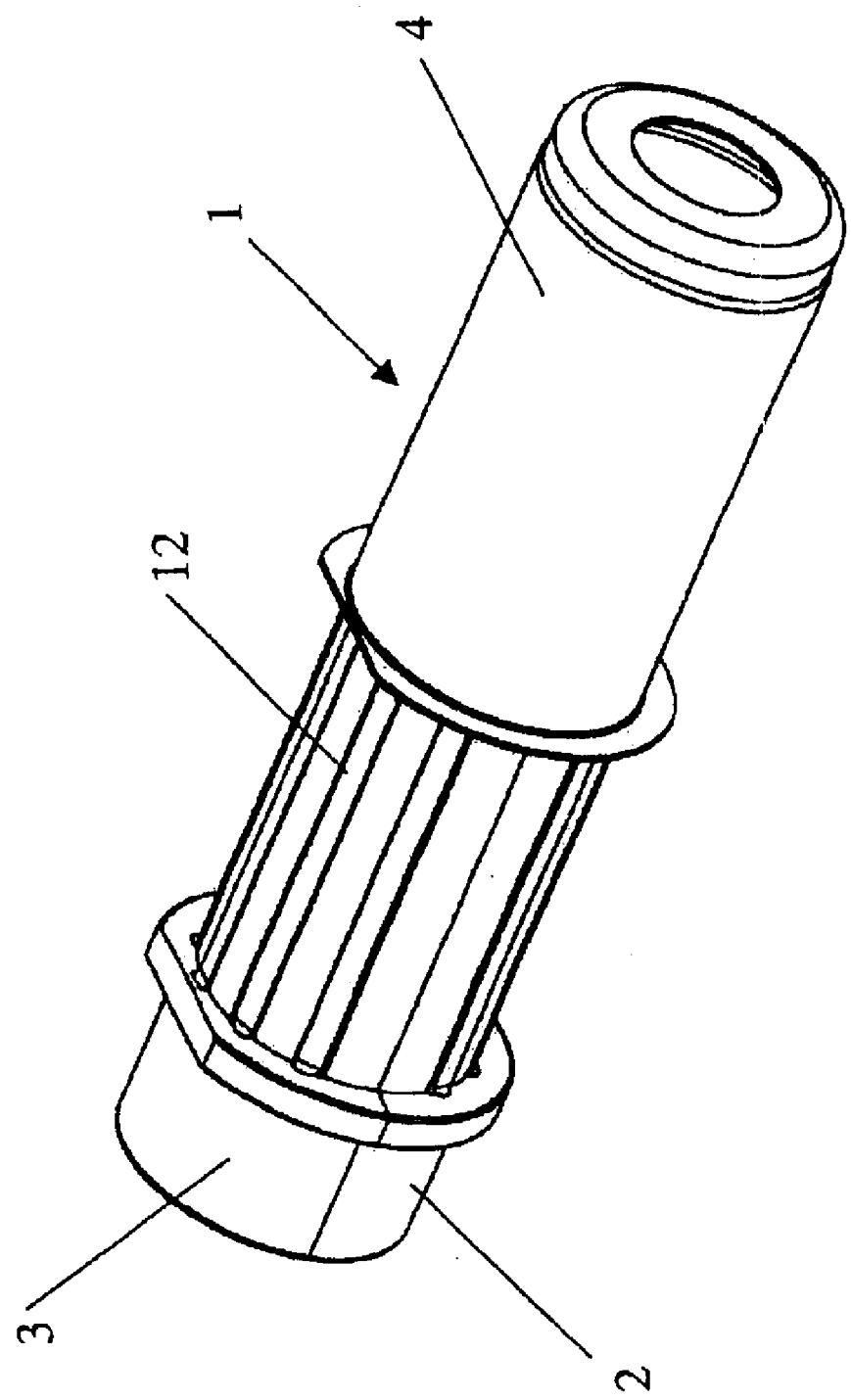
FIG. 3 shows an actuator with a sleeve partially pushed onto the housing.

FIGS. 1 through 3 show an actuator 1 which is comprised of two housing parts 2, 3. The housing parts 2, 3 are partially surrounded by a deep-drawn sleeve 4. In the actuator 1, the retainer 5 is arranged so as to be accessible from the exterior. The detonator 6 is located adjacent to the retainer 5. Moreover, the piston 8 with its piston rod 9 is arranged in the actuator 1. The piston 8 and the piston rod 9 are hollow in order to provide a reduced weight. The housing parts 2 and 3 are connected to one another at their joint locations by tongue 10 and groove 11. The exterior of the housing parts 2, 3 is provided with longitudinal ribs 12 facilitating slipping or pushing the sleeve 4 onto the housing.

Figure 4:
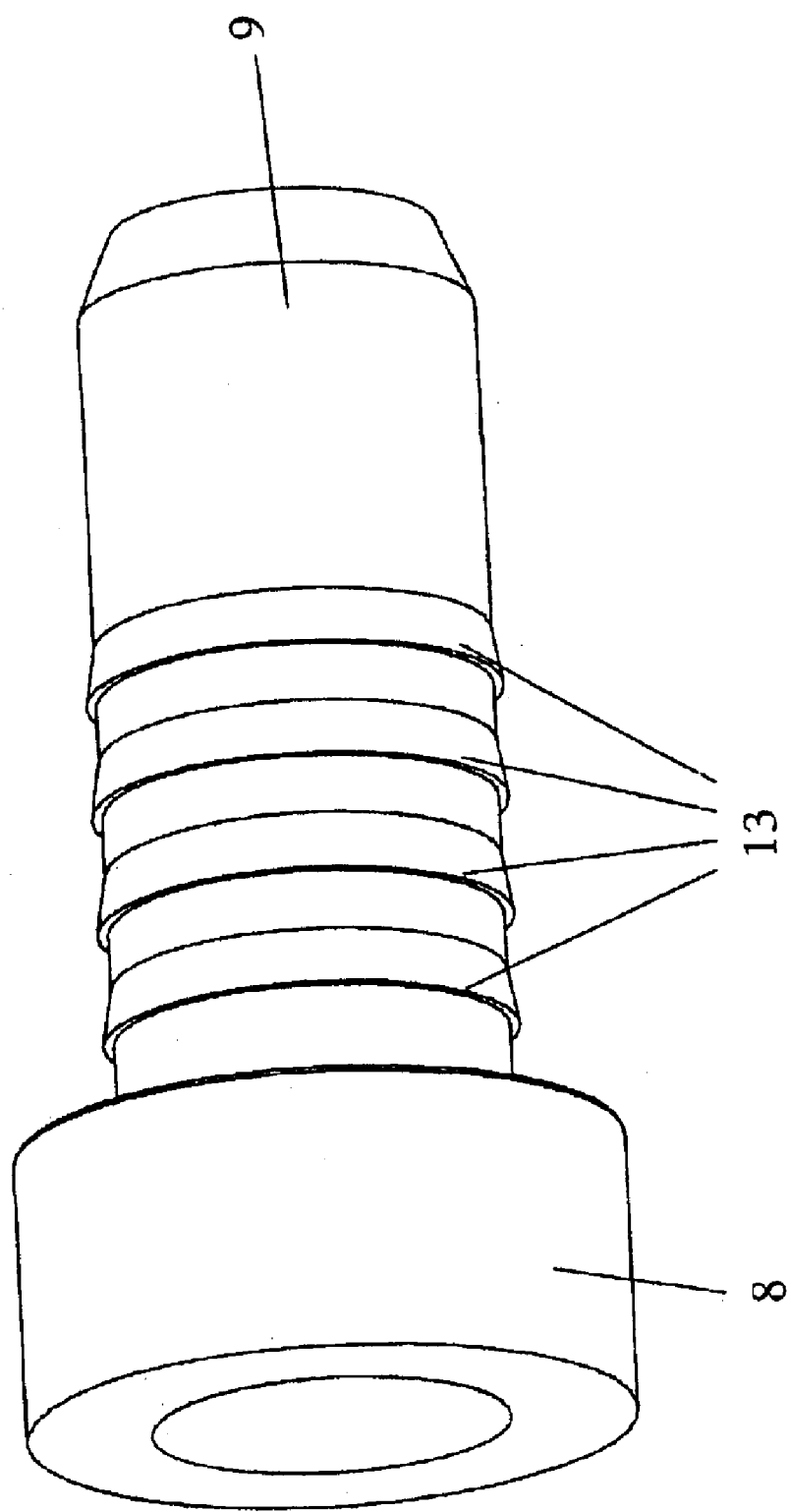
FIG. 4 shows an alternative embodiment of a piston.

FIG. 4 shows the piston 8 with the piston rod 9 provided with cutting grooves 13. The cutting grooves 13 allow movement of the piston 8 from the initial position to the end position but they prevent a movement of the piston 8 in the opposite direction by cutting into the housing 2, 3 so that the piston 8 cannot be returned into the initial position.

Figure 5A:
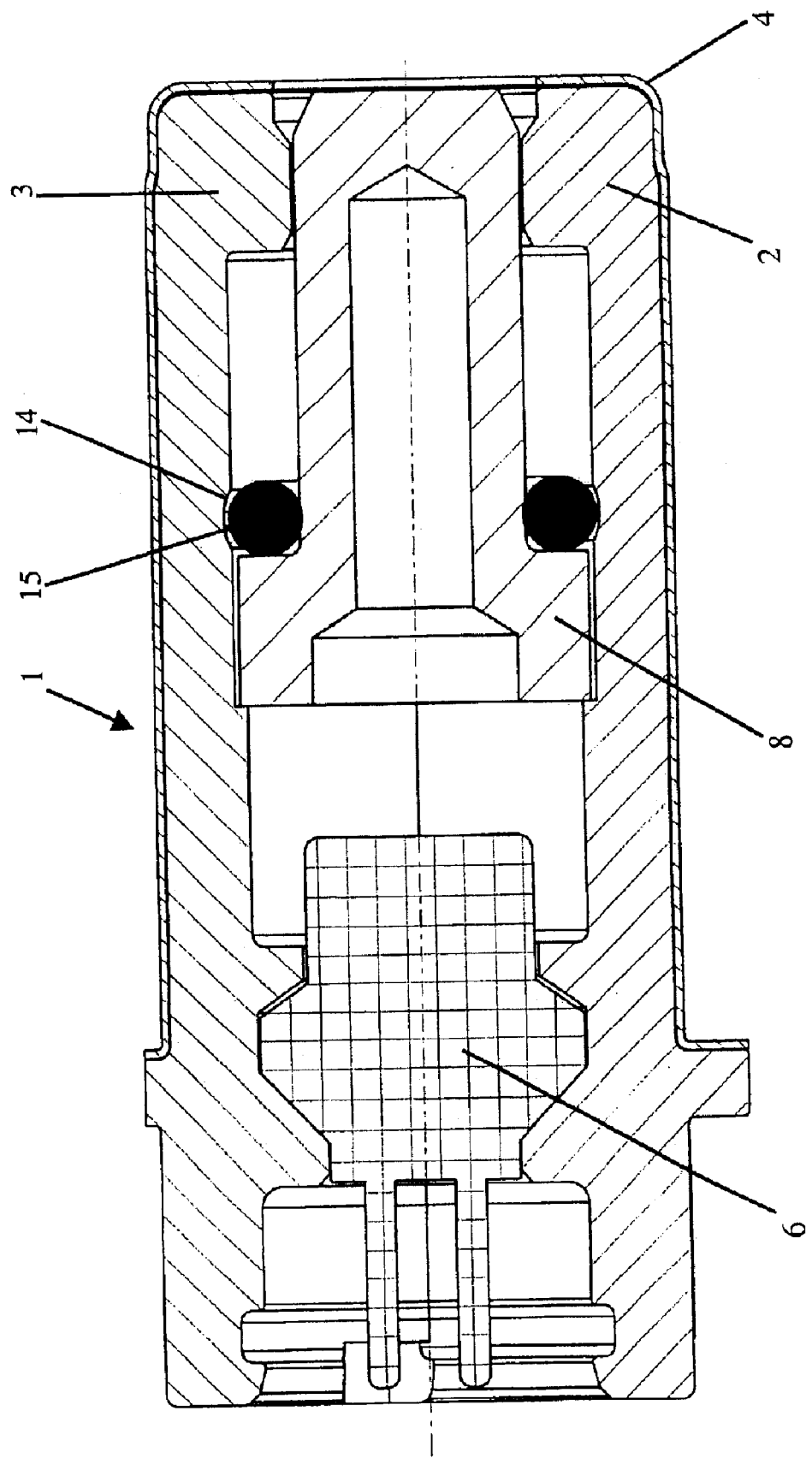
FIGS. 5a and 5b show section views of two other embodiments.
Figure 5:
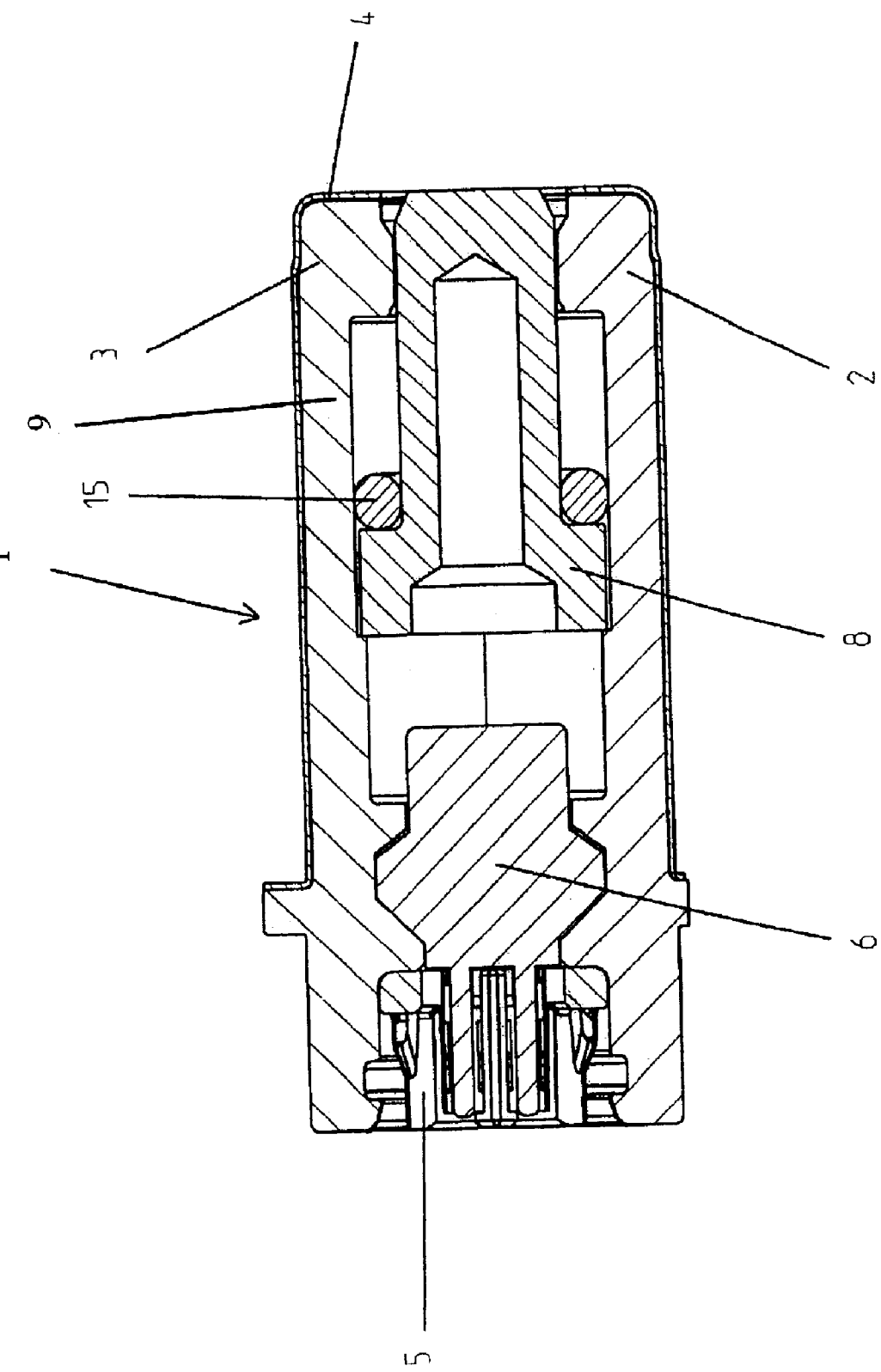

FIG. 5a shows that a groove is provided in each housing part 2, 3, and these grooves together form an annular groove 14 into which an O-ring 15 is inserted (rest position). The O-ring 15 prevents that the piston 8 can be moved accidentally from its initial position into its end position. After igniting the detonator 6, the O-ring 15 is pushed out of the annular groove 14. When doing so, it is pushed more tightly against the piston rod 9. This prevents that flames, possibly moving past the piston 8, can pass the O-ring 15. Shortly before the piston 8 reaches its end position, the O-ring 15 has already reached its terminal position. It effects a dampened contact of the piston 8 on the housing 2, 3 in the end position of the piston 8.

FIG. 5b shows an actuator 1 similar to the one illustrated in FIG. 5a which however does not require a groove. The O-ring 15 is clamped in its rest position against the housing 2, 3 and the piston rod 9 such that the piston 8 is not easily movable. Only after igniting the detonator 6, the piston 8 is moved together with the O-ring 15 from the initial position into the end position (piston) and from the rest position into the terminal position (O-ring), respectively.

Figure 6:
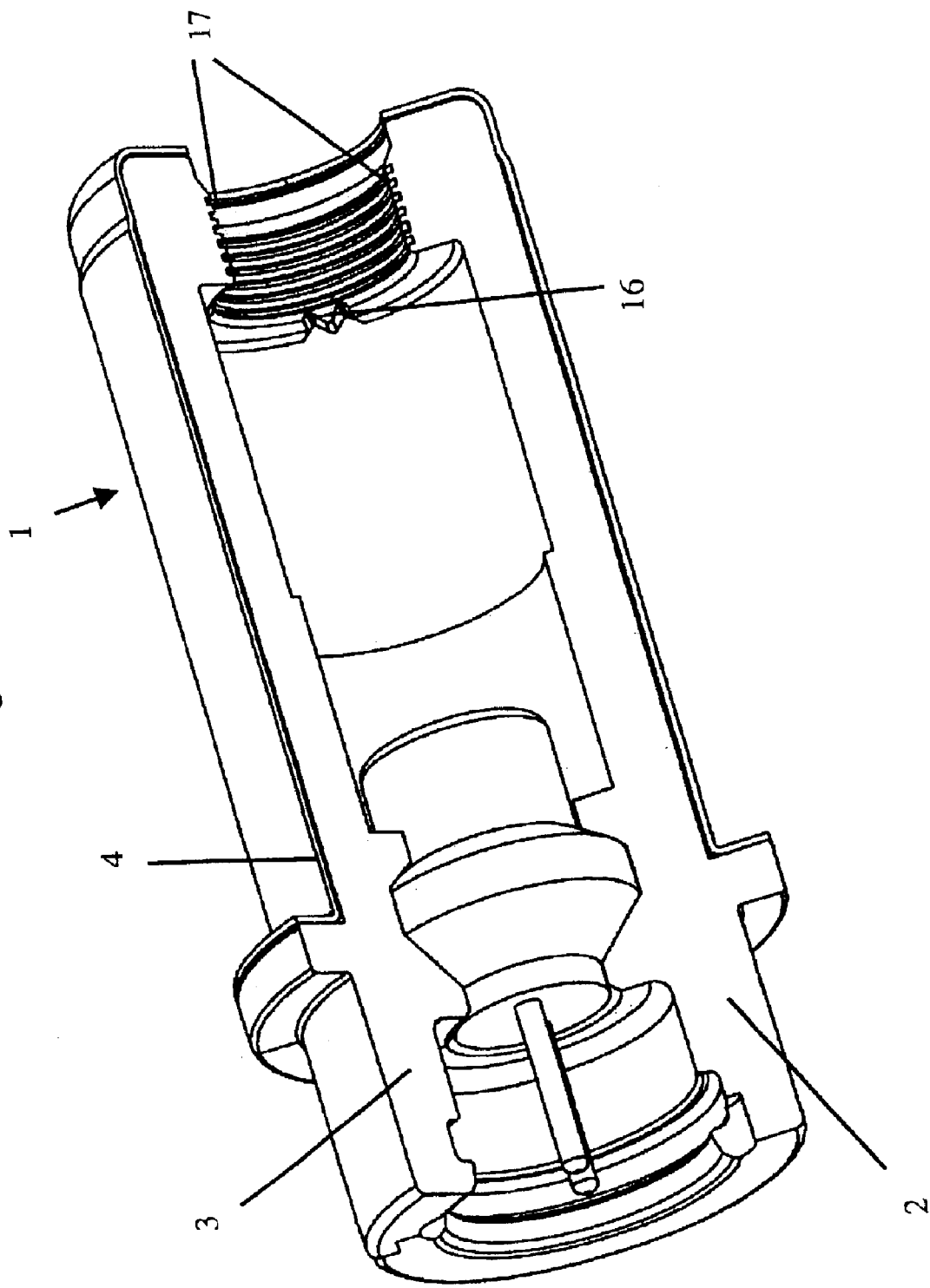
FIG. 6 shows an actuator with labyrinth-type recesses.

Instead of the O-ring 15, as shown in FIG. 6, noses (teeth) 16 can be provided for damping the housing parts 2, 3. The noses 16 are deformed when the piston impacts on them; the kinetic energy is converted into deformation energy. Optionally, the noses 16 have correlated therewith recesses (not illustrated) into which the noses 16 can be pressed. In place of the noses, other damping means, for example, a Teflon® ring can be provided.

FIG. 6 shows a similar illustration as FIG. 1 in which however the housing parts 2, 3 have labyrinth-type recesses 17. These labyrinth-type recesses 17 have the effect that the flames which pass the piston 8 swirl turbulently in the recesses and fizzle out. Also, the sound waves swirl turbulently in the recesses so that the recesses effect an additional sound damping action.

While specific embodiments of the invention have been shown and described in detail to illustrate the inventive principles, it will be understood that the invention may be embodied otherwise without departing from such principles.

What is claimed is:

1. A pyrotechnical actuator, comprising:
    a cylindrical housing surrounding a hollow chamber;
    a piston movably supported in the cylindrical housing;
    a piston rod connected to the piston;
    a detonator arranged within the hollow chamber and configured to produce a quantity of gas for moving the piston from an initial position in the cylindrical housing into an end position;
    wherein the piston rod triggers an action when the piston moves into the end position or is positioned in the end position;
    wherein the cylindrical housing is divided in a longitudinal direction of the cylindrical housing into housing parts;
    at least one holding element securing the housing parts relative to one another.

2. The pyrotechnical actuator according to claim 1, wherein the cylindrical housing is formed of two of the housing parts and wherein the at least one holding element is a sleeve surrounding at least a portion of the cylindrical housing.

3. The pyrotechnical actuator according to claim 2, wherein the sleeve surrounds the cylindrical housing with press fit.

4. The pyrotechnical actuator according to claim 1, wherein the housing has an outer periphery provided with longitudinal ribs.

5. The pyrotechnical actuator according to claim 1, wherein the housing parts have common joint surfaces provided with tongue and groove for connecting the housing parts.

6. The pyrotechnical actuator according to claim 1, wherein at least the piston is hollow.

7. The pyrotechnical actuator according to claim 6, wherein the piston rod is hollow.

8. The pyrotechnical actuator according to claim 1, wherein the piston rod has cutting grooves and wherein the cutting grooves, when the piston moves from the end position toward the initial position, cut into the cylindrical housing.

9. The pyrotechnical actuator according to claim 1, further comprising an O-ring arranged in the initial position of the piston in an annular groove of the cylindrical housing such that the O-ring surrounds the piston rod and rests against the piston, wherein the O-ring prevents an accidental movement of the piston and wherein the O-ring, upon triggering of the actuator, is forced by the piston out of the annular groove into a terminal position.

10. The pyrotechnical actuator according to claim 9, wherein the O-ring in the terminal position effects damping of a piston movement into the end position.

11. The pyrotechnical actuator according to claim 1, further comprising an O-ring arranged in the initial position of the piston in a rest position in the cylindrical housing such that the O-ring surrounds the piston rod and rests against the piston, wherein the O-ring prevents an accidental movement of the piston and wherein the O-ring, upon triggering of the actuator, is forced by the piston out of the rest position into a terminal position.

12. The pyrotechnical actuator according to claim 11, wherein the O-ring in the terminal position effects damping of a piston movement into the end position.

13. The pyrotechnical actuator according to claim 1, wherein at least one of the piston and the housing is provided with noses which in the end position of the piston effect damping of the piston movement.

14. The pyrotechnical actuator according to claim 1, comprising a Teflon ring arranged between the housing and the piston in the area of the end position of the piston for effecting damping.

15. The pyrotechnical actuator according to claim 1, wherein at least one of the housing and the piston rod has labyrinth-type recesses.

* * * * *